United States Patent
Ehrlich et al.

(10) Patent No.: US 12,392,581 B2
(45) Date of Patent: Aug. 19, 2025

(54) TELESCOPIC SIGHT

(71) Applicant: SMART SHOOTER LTD., Kibbutz Yagur (IL)

(72) Inventors: Avshalom Ehrlich, Kibbutz Ramat Hashofet (IL); Hagai Krupnik, Nofit (IL); Dor Levi, Kibbutz Hasoleim (IL); Zahi Giladi, Kibbutz Ramat David (IL)

(73) Assignee: SMART SHOOTER LTD., Kibbutz Yagur (IL)

( * ) Notice: Subject to any disclaimer, the term of this patent is extended or adjusted under 35 U.S.C. 154(b) by 0 days.

(21) Appl. No.: 18/283,801

(22) PCT Filed: Mar. 24, 2022

(86) PCT No.: PCT/IB2022/052716
§ 371 (c)(1),
(2) Date: Sep. 24, 2023

(87) PCT Pub. No.: WO2022/201094
PCT Pub. Date: Sep. 29, 2022

(65) Prior Publication Data
US 2024/0167787 A1    May 23, 2024

(30) Foreign Application Priority Data
Mar. 25, 2021 (IL) .......................... 281842

(51) Int. Cl.
*F41G 1/38* (2006.01)
*F41G 3/16* (2006.01)
(Continued)

(52) U.S. Cl.
CPC .............. *F41G 1/38* (2013.01); *F41G 3/165* (2013.01); *G02B 23/12* (2013.01); *G02B 23/145* (2013.01)

(58) Field of Classification Search
CPC   F41G 1/38; F41G 3/165; G02B 23/12; G02B 23/145
(Continued)

(56) References Cited

U.S. PATENT DOCUMENTS

| 2012/0106170 A1* | 5/2012 | Matthews ................. F41G 1/30 |
| | | 362/311.06 |
| 2014/0028856 A1* | 1/2014 | Ehrlich ..................... F41G 3/08 |
| | | 348/169 |

FOREIGN PATENT DOCUMENTS

WO     WO-2020106340 A2 *  5/2020  ............... F41G 1/30

OTHER PUBLICATIONS

International Search Report for PCT/IB2022/052716 Mailed on Jun. 26, 2022.

* cited by examiner

*Primary Examiner* — Daniel A Hess
(74) *Attorney, Agent, or Firm* — Rivka Friedman (57) ABSTRACT

A telescopic sight for firearms including: magnifying elements disposed along a user optical path between an objective lens assembly and an ocular lens; an imaging system including an imaging sensor and an image processor; a digital optical augmentation (DOA) system disposed outside of the user optical path; at least one optical element adapted to: redirect a spectrum of incoming light from the objective lens assembly to the imaging sensor along a video optical path, redirect/reflect digital markings projected from the DOA system into the user optical path and disallow the projected digital markings from reaching the imaging sensor, and wherein the imaging system is adapted to capture and process imagery from the incoming light to provide image processing data.

20 Claims, 5 Drawing Sheets

(51) Int. Cl.
    *G02B 23/00*  (2006.01)
    *G02B 23/12*  (2006.01)
(58) Field of Classification Search
    USPC .......................................................... 235/411
    See application file for complete search history.

TELESCOPIC SIGHT

FIELD OF THE INVENTION

The present invention relates to a telescope and, more particularly, to a telescopic sight for handheld devices such as a rifle, shoulder rocket/missile launcher, laser designator etc. integrated with a fire control system or for use in conjunction with a fire control system.

BACKGROUND OF THE INVENTION

Legacy telescopic sights which have a video capture function capture the imagery of what the user sees. This includes all the markings and reticle/crosshairs etc. and any other digital augmentation. When the image is processed, these markings/or physical elements obstruct part of the scene captured by the video. In order to process the imagery, these obstructions need to be digitally removed.

SUMMARY OF THE INVENTION

According to the present invention there is provided a telescopic sight for firearms including: magnifying elements disposed along a user optical path between an objective lens assembly and an ocular lens; an imaging system including an imaging sensor and an image processor, the imaging system disposed outside of the user optical path; a digital optical augmentation (DOA) system disposed outside of the user optical path; at least one optical element disposed within the user optical path between the objective lens assembly and the ocular lens, the at least one optical element adapted to: redirect at least a portion of a spectrum of incoming light from the objective lens assembly to the imaging sensor along a video optical path defined as being between the objective lens assembly and the imaging sensor, redirect/reflect digital markings projected from the DOA system into the user optical path and disallow the projected digital markings from reaching the imaging sensor, and allow at least a portion of the incoming light from the objective lens assembly to pass through the at least one optical element to the ocular lens; and wherein the imaging system is adapted to capture and process imagery from the incoming light redirected along the video optical path to the imaging sensor to provide image processing data.

According to further features in preferred embodiments of the invention described below the sight further includes a firing processor, the firing processor including a firing computer. According to still further features in the described preferred embodiments the firing processor, further includes a firing decision module. According to still further features the firing processor, further includes an Epsilon logic module.

According to still further features at least a portion of the digital markings from the DOA system are derived from at least one of: the image processing data, a firing processor and other components of the telescopic sight.

According to still further features the magnifying elements are disposed with the objective lens assembly, the magnifying elements providing fixed or dynamic magnification. According to still further features the sight further includes an erector lens assembly disposed between the objective lens assembly and the ocular lens wherein the magnifying elements is disposed within the erector lens assembly, the set of lenses providing fixed or dynamic magnification. According to still further features the magnifying elements provide dynamic magnification where some of the magnifications are less than zoom×1.

According to still further features the sight further includes a mechanical reticle disposed within the user optical path between the at least one optical element and the ocular lens, such that the mechanical reticle is not within the video optical path.

According to still further features the at least one optical element includes a first beam splitting element adapted to redirect the portion of the spectrum of incoming light from the objective lens assembly to the imaging sensor along the video optical path; and wherein the at least one optical element further includes a second beam splitting element adapted to redirect/reflect the digital markings projected from the DOA system into the user optical path and disallow the projected digital markings from reaching the imaging sensor, the second beam splitting element being closer to the ocular lens than the first beam splitting element. According to still further features the sight further includes a mechanical reticle disposed between the first beam splitting element and the ocular lens.

According to still further features the sight further includes a light blocking element movably disposed between the first beam splitting element and the second beam splitting element.

According to still further features the at least one optical element includes a beam splitting element adapted to redirect the portion of the spectrum of incoming light from the objective lens assembly to the imaging sensor along the video optical path; and to redirect/reflect the digital markings projected from the DOA system into the user optical path and disallow the projected digital markings from reaching the imaging sensor. According to still further features the sight further includes a mechanical reticle disposed between the beam splitting element and the ocular lens.

According to still further features the telescopic sight is adapted to be operationally coupled with a night vision enhancing apparatus such that imagery from the night vision enhancing apparatus is received at least at the imaging sensor. According to still further features the imagery from the night vision enhancing apparatus is received in the video optical path and the user optical path via the objective lens assembly. According to still further features the imagery from the night vision enhancing apparatus is received via wired or wireless communication directly to the imaging processor and displayed by the DOA system.

According to still further features in a see-through mode, a user views a real-world scene via see-through optics in the user optical path, with the digital markings superimposed onto the real-time scene. According to still further features in a video mode, the DOA system causes a video to be visible via the ocular lens, wherein the video is a real-time video with the digital markings superimposed onto the real-time video. According to still further features in a see-through mode or a video mode, the imagery from the night vision enhancing apparatus is fused with a real-time scene or video.

According to still further features the sight further includes a laser source adapted to project a laser beam via the user optical path, out of the objective lens assembly. According to still further features the telescopic sight is operationally coupled to a fire control mechanism which is adapted to receive inputs at least from the firing decision module. According to still further features the telescopic sight is operationally coupled to user controls, the user controls are adapted for at least locking onto a target.

According to still further features the telescopic sight is operationally coupled to sensors.

According to another embodiment there is provided a telescopic sight for firearms includes: a set of optical elements for magnification disposed along a user optical path between an objective lens assembly and an ocular lens; an imaging system including an imaging sensor and an image processor, the imaging system disposed outside of the user optical path; a digital optical augmentation (DOA) system including a transparent micro-display adapted to display digital markings in the user optical path;

an optical element disposed within the optical path between the objective lens assembly and the ocular lens, the optical element is adapted to: redirect reflect at least a portion of a spectrum of incoming light from the objective lens assembly to the imaging sensor, and allow at least a portion of the incoming light from the objective lens assembly to pass through the optical element to the ocular lens; and wherein the imaging system sensor is adapted to capture and process imagery from the incoming light redirected to the imaging sensor to provide image processing data.

BRIEF DESCRIPTION OF THE DRAWINGS

FIG. 5 is a telescopic sight 10 with a NV 50 clip-on.

DESCRIPTION OF THE PREFERRED EMBODIMENTS

The principles and operation of a telescopic sight/riflescope for working in conjunction with a fire control system, according to the present invention, may be better understood with reference to the drawings and the accompanying description. The instant fire control system is generally intended for use together with handheld devices such as a rifle, shoulder rocket/missile launcher, laser designator etc. The following description relates primarily to a rifle-mounted scope but is not limited in any way to such an implementation or use.

Device Outline

According to the instant innovative telescopic riflescope, there is an imaging sensor that is integrated into the body of the scope itself, sharing at least a portion of the optical path to the user's eye (hereafter 'user optical path'). This integration affords a number of advantages, some of which are detailed hereafter. One advantage is that the integrated configuration saves on the need for additional optics and mechanical components, all of which increase the volume, weight and price of the system. The integrated telescope, according to the instant innovation, is a narrow telescope that maximizes the existing optics. Without the integrated structure, it would be necessary to add at least another lens to the separate camera. Such a lens would need to be quite large in order to match the telescopic capability of the riflescope. In addition, there will be displacement (occasionally noted as Parallax) between the Line of Sight (LOS) of the eye and the LOS of the sensor that impose a distance dependent error.

Another advantage of the instant system is that the configuration is suitable to having various "clip-on" devices attached to the firearm or sight. These clip-on devices then provide whatever specific functionality to both the user and the imaging sensor. The imaging sensor (as well as the user) captures/'sees' the clip-on's own display via see-through optics. The configuration also allows the user to watch original quality video (without additional latency), while the system only adds projected markers (in one or more colors). An example of a clip-on device is an analog image intensifier (night-vision) clip-on device that is adapted to be removably attached to the firearm or riflescope, in front of the riflescope. This feature is discussed in detail below.

Yet another advantage is that the integrated configuration allows for maintaining high accuracy between the image (scene) that goes to the imaging sensor and the image/scene together with the computer-generated markers that go to the user's eye. Maintaining such high accuracy is challenging when it comes to two separate optical systems. However, in the instant system, once zeroed, the integrated systems can stay that way for long periods and through rigorous use. Still another advantage is the lack of parallax between the imaging sensor and the optical path.

One major advantage is that the imaging sensor receives a clear view of the scene, without any obstructions from mechanical reticle/crosshairs or digital markings. This innovative configuration is very advantageous for image processing, as will be detailed below.

Glossary and Brief Description

Digital augmentation—refers to the addition of digital markings or drawings to a scene as viewed by the user. The scene may be a real view, seen through see-through optic or a video display. The markings may be displayed by a micro-display that is projected into the user optical path via an optical element that is see-through to the user (like a Heads Up Display). The terms, projected objects, augmentations, markers, drawings and variations thereof are used interchangeably, and all refer to digital augmentation.

Field of View (FOV)—The terms 'field of view (FOV)', 'scene', 'imagery' are all interconnected. When used herein, the terms 'scene' and 'view' refer to what can be seen by the user and/or image sensor through the telescope, without any additional aiming aids (e.g., projected objects, mechanical reticle, etc.). The FOV of the scene is the light that enters through the objective lens, where the focal length of the objective lens defines the FOV. Sometimes optics or devices (e.g., clip-ons) are added in front of the objective, but this does not detract from the definition. The user and imaging sensor see the scene, which is the current, live view of what is visible and happening in front of the telescopic sight. The FOV refers to how much of the 'scene' or 'view' the telescope/user can see.

The term 'imaging sensor' is used throughout the description and in the claims. An image sensor or imager is a sensor that detects and conveys information used to make an image. It does so by converting the variable attenuation of light waves (as they pass through or reflect off objects) into signals, small bursts of current that convey the information. The waves can be light or other electromagnetic radiation.

Telescopic sight, telescopic scope, riflescope, riflesight are all terms used interchangeably herein to describe the optical device 10 of the instant innovation.

Introduction—SMASH 2000—Fire Control System

The instant telescopic sight can be a self-contained Fire Control System (FCS) or can be used in conjunction with an FCS. The telescopic sight, depending on embodiments and implementations, may have features in common with the SMASH 2000 system. Therefore, the description of the SMASH 2000 system that follows, describes features that are also to be seen as disclosed in the instant system and not only in the SMASH 2000 system.

SMASH 2000 is a smart electro-optic sight and FCS that are adapted to be installed on small arms such as an assault rifle. SMASH 2000 is manufactured by Smart Shooter Ltd. (Kibbutz Yagur, Israel). The sight includes, at least, an image system, a firing processor and a micro display (DOA system), user controls and various optional add-ons and additional modules.

The imagery is acquired by an image sensor and processed in real time by a microcomputer. This image processing allows the sight to detect and track stationary and moving targets, both on the ground and in the air.

SMASH 2000 sight automatically and/or under user operation highlights, locks onto and tracks potential targets. The system also presents to the user a "firing zone", that represents aim correction that takes into account the necessary ballistics corrections, including target movement. SMASH 2000 sight module is an FCS by itself and can significantly improve operator fire accuracy.

The sight has multiple operational modes: a see-through reflex sight (red-dot) for rapid fire; a day mode for fire control assisted shots using see-through projected markers; and a night mode for fire control assisted shots using video display. In both Day and Night modes (see-through and video modes), the symbols of 'locked' target, 'firing zone' and other symbols are superimposed on top of the view of the real world. The sight includes a micro display on which the symbols are displayed in such a way that they augment the view of the real world.

The difference between Night mode and Day mode is that in Night mode, the real world is shown to the user via video projection on the same micro display since the image sensor of the system is much more sensitive than the human eye. In the Day mode, the real-world scene is visible through the see-through optics while the markings are projected onto the scene by the micro display.

The full SMASH 2000 FCS, also includes a Fire Control Mechanism (FCM), that, in most cases, replaces the original grip of an assault rifle, and is connected to the sight module.

The objective of the FCM is to allow an "assisted shot" mode by timing the bullet discharge on a locked target to a moment when the hit probability is high enough, and by that to minimize the differential effect of the individual shooter (resulting from factors such as stress, fatigue and shooting skills). This timing is provided to FCM by the sight module that performs the necessary calculations based on locked target parameters, user stability, range and more. Working in tandem, sight and FCM modules allow the user to achieve the highest hit rate.

Innovatively, some or all of the capabilities of the SMASH 2000 FCS described up to here may be integrated into the instant telescopic sight/FCS such that all the detailed heretofore apply likewise to the instant telescopic sight while overcoming numerous challenges as detailed below.

Figure 1:
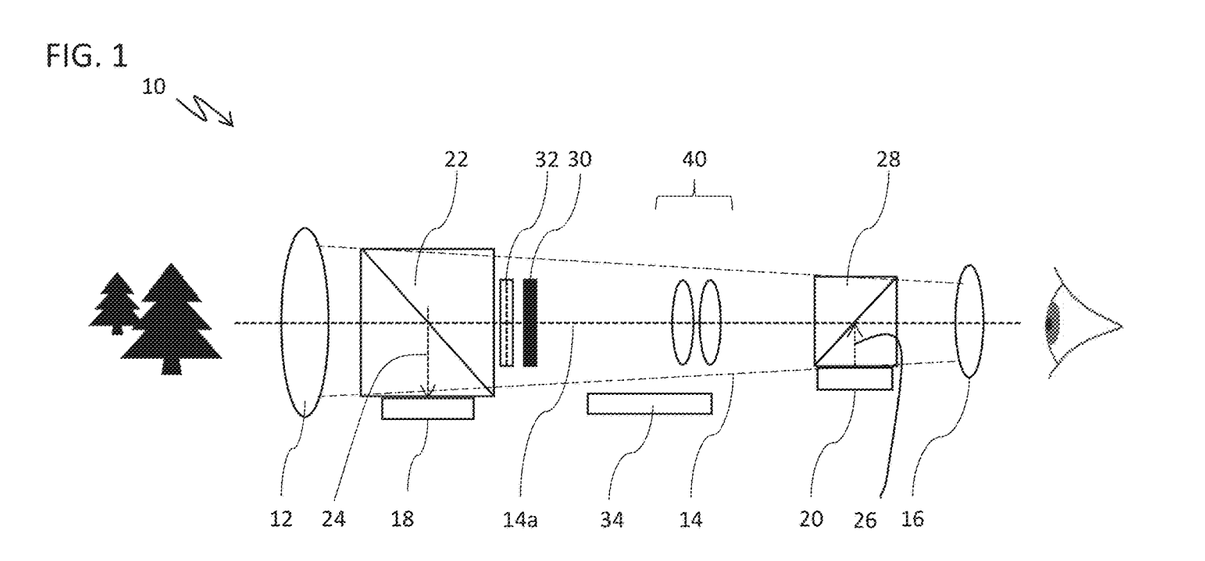
FIGS. 1 and 1A are a schematic diagrams of an embodiment of the innovative device.

Referring now to the drawings, FIG. 1 illustrates a schematic diagram of an embodiment of the innovative device. Device 10 is a telescopic sight which can be used on a rifle. As a generalization, the innovative scope is comprised of two types of components: optical components and electronic components. The optical components, by-and-large, are disposed within the optical path. The computer-based components are generally outside of the optical path. The direction of description of the device is from the direction of light entering the device (front) towards the user (back).

In FIG. 1, the light/radiation from the trees, which represent the scene, travels into the scope via the front of the scope. At the front of the device is an objective lens or assembly of lenses 12. On the back, user end (proximal side, represented by the eye) of the device is an ocular lens (eyepiece) or assembly of lenses 16. Between the objective and ocular lenses is the user optical path 14 of the sight through which light travels before exiting the ocular lens. The optical path of device 10 includes other optical elements that correspond to optical elements of legacy telescopic sights. The sight 10 preferably has a physical aiming aid 32 such as a mechanical crosshair or an etched reticle. In some cases, the etched reticle or crosshair, etc. can be selectively illuminated. A mechanical crosshair or etched reticle (and the like) is included so that even if the computer-based augmentation system fails, the scope will still be useful as a 'dumb' optics-based riflescope. In some embodiments, there is no physical aiming aid.

The optical path, as depicted in FIG. 1, is a linear optical path, however, the optical path may alternatively be non-linear. For the sake of clarity, the optical path (broken lines) is depicted only at the outer bounds of the path, in order not to obscure the elements within the path. A central line 14*a* indicates a linear Line of Sight (LOS), (also referred to as optical axis) which is part of the optical path. The optical path including the central line is simply referred to hereafter as the optical path 14.

Figure 1A:
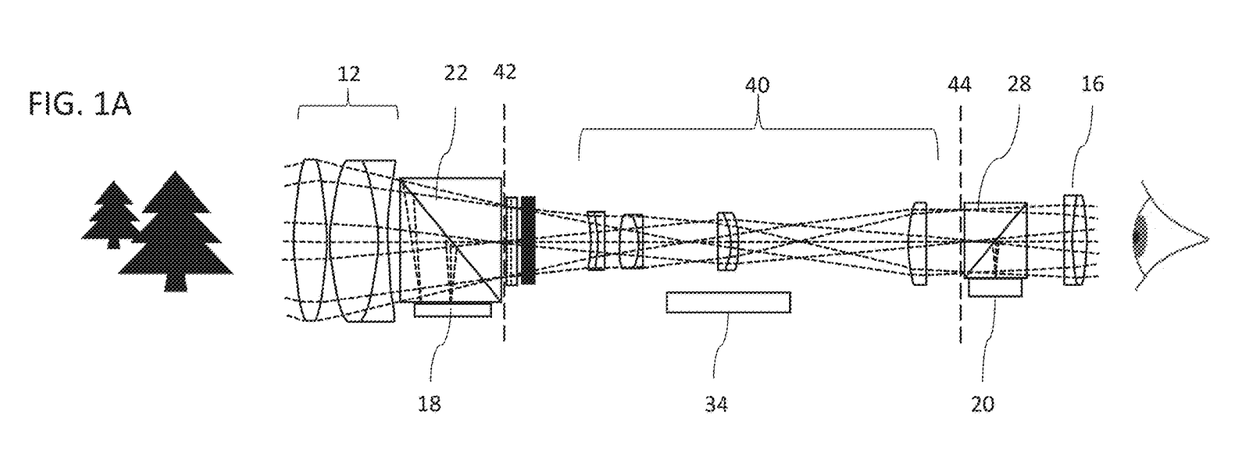

FIG. 1A illustrates an embodiment of the innovative sight, with a more classical (a more accurate) representation of the path of light through the device, and schematically appropriate lens representations. FIGS. 1 and 1A include an erector or relay assembly 40 which is disposed between a first focal plane (FFP) 42 and a second focal plane (SFP) 44. The FFP 42 is between the objective 12 and the erector assembly 40 and the SFP 44 is between the erector assembly 40 and the ocular lens 16, This configuration is merely exemplary.

Referring both to FIGS. 1 and 1A, innovatively, device 10 further includes an imaging system 18 and a Digital Optical Augmentation (DOA) system 20. These two systems are disposed outside of the user optical path. However, within the optical path there is a first Beam Splitting Element (BSE) 22. The first BSE 22 reflects light from the user optical path to the imaging system 18, forming a second optical path referred to herein as the video optical path 24. To be clear, the light is not redirected to the video optical path but rather—in general—passes through the first BSE 22 and is also reflected to the imaging sensor. A more precise and detailed discussion of the first BSE is found elsewhere herein. The imaging system 18 includes an imaging sensor that captures the scene and an image processor that processes the captured images and serves as the "brains" for detecting, tracking etc. of the targets as well as providing the firing processor 34 with data for various calculations and decision making. Innovatively, the imaging sensor captures a clear view of the scene, without any aiming paraphernalia (such as mechanical cross hairs, etched reticle etc.) or digital augmentations cluttering the scene.

The DOA system 20 projects visual augmentation objects (markings, drawings, text, video display, etc.) into the optical path so that they can be seen by the user as overlaying the scene viewed through the scope. One exemplary method of projecting the augmentation objects (including displaying video, as discussed elsewhere herein) is to project the augmentation via an augmentation path 26 onto a second BSE 28 which redirects the augmentation into the user optical path 14. The second BSE 28 allows light from the scene to pass through the second BSE (in a similar fashion to the way in which the same light passes through the first BSE 22), presenting as a see-through optic whereby the user sees the real scene via the optics. DOA system projects augmentation objects into the optical path. Some of these objects can be generated based on input from the imaging system.

The instant representation of the scope provides a linear LOS see-through optical solution. This does not exclude alternative implementations using Porro or roof prisms which may not give a linear LOS view (e.g., in the case of Porro prisms) and are not see-through optics (at least not in the classical interpretation of the term; rather these are reflective optics where the optical path is reflected off various surfaces). As used herein, the term "see-through optics" is used to refer to non-deflected optical path—even if the optics magnify the scene. In some embodiments discussed below, the functions of the two BSEs (referred to above) are integrated into a single element. As such, the two-BSE configuration is not to be considered limiting, but merely exemplary. An expanded discussion of various configurations of the optical elements (and correspondingly, the electronic components) is provided below with reference to FIGS. 3A to 3E.

Optical Element—Beam Splitting Element (BSE) The term beam splitting element (BSE) is used herein to generically refer to any component that at least partially, reflects, filters, transmits and/or refracts a light wave coming into contact with it. The BSE may be a beam splitter or a waveguide that filters out certain colors or wavelengths from the beam of light. For example, a dichroic beam splitter may be adapted to filter the color/wavelength that is projected by the DOA or captured by the imaging sensor. In some cases, a combination of beam-splitter and filter can be used. For example, there are beam splitters that can reflect 90% of the specific color/wavelength and transmit 10%; the remaining 10% can be filtered out by adding an additional filter.

The term optical element(s) is used herein to include all light reflecting/refracting apparatuses configured to redirect or absorb a portion of the light while allowing another portion of the light to pass therethrough. The term optical element includes, beam splitters, electro-optical modulators, filters, mirrors, switchable mirrors, mechanically moveable (e.g. in and out of an optical path) mirrors and other optical elements, etc.

The instant telescopic sight may include one or more such optical elements. The at least one optical element is disposed within the user optical path between said objective lens and said ocular lens. The at least one optical element is adapted to: (1) redirect at least a portion of a spectrum of incoming light from the objective lens to the imaging sensor along a video optical path defined as being between the objective lens and the imaging sensor; (2) redirect/reflect digital markings and/or video projected from the DOA system into the user optical path and disallow the projected digital markings from reaching the imaging sensor; and (3) allow at least a portion of the incoming light from the objective lens to pass through the at least one optical element to the ocular lens.

In summary, the optical components of the scope include the objective, erector and ocular lenses as well as the optional physical reticle (and a light-blocking member dis-cussed below). In addition, beam splitting elements within the user optical path enhance the scope function by tying in the functionality, input and output of the computer-based components. The optics are applied in tandem with the computer-based components to provide a novel and innovative 'smart' telescopic sight.

Figure 2:
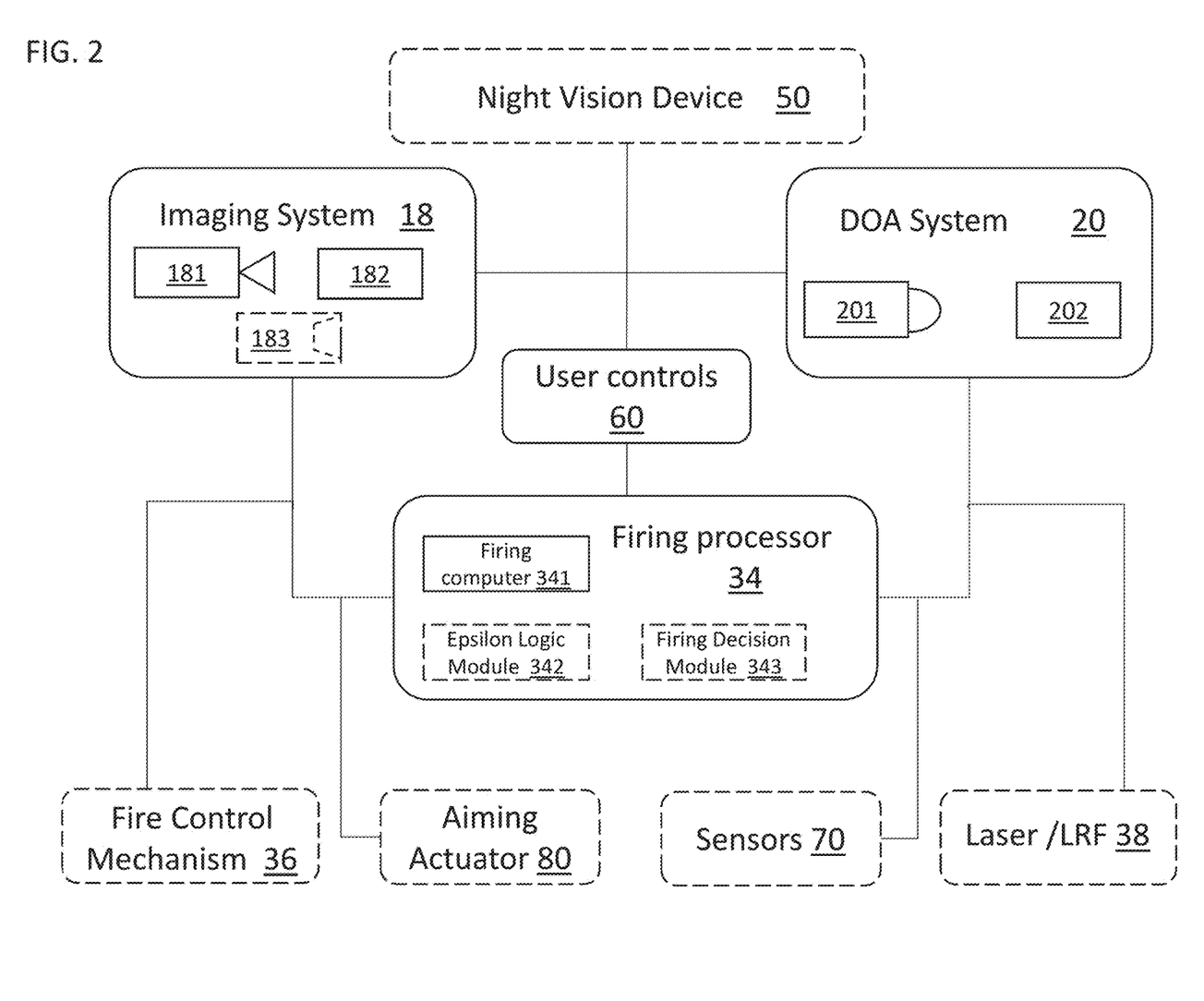
FIG. 2 is a block diagram of some of the main electronic components of the telescopic sight.

FIG. 2 is a block diagram of some of the main computer-based components of the telescopic sight. The imaging system 18 includes an imaging sensor 181 that captures the scene and an image processor 182 that processes the captured images. Image processing/computer vision is instrumental in various stages of a firing cycle. However, there can be many sub processes that take place in parallel. Notwithstanding, some exemplary activities of the components are discussed hereafter to illustrate some of the interconnectivity between the components.

Initially, the imaging processor 182 processes the captured scene to distinguish background from potential targets. Image processing is used on the imagery captured by the imaging sensor in order to achieve all the functionality detailed herein. The term image processing is used as an umbrella term for all the various types of methods and processes which are used for processing the captured images. The terms image processing and computer vision are used interchangeably herein and can refer to any of the methods known in the art, including, but not limited to, image processing, machine learning (ML), deep learning, artificial intelligence (AI), neural networks and any other types of algorithms and processes.

Processed image data is constantly provided to the DOA system 20. DOA 20 includes a component for displaying the visual objects (Usually referred to as: static/dynamic symbols and alphanumeric characters) including video. In some embodiments, there is a visual objects projector 201 which 'draws' the markings on or around (or in front of) potential targets as necessary, even when a target and/or the barrel are moving around (using constantly updated information from the imaging system). The projector projects the markers onto a see-through optic, such as the second BSE 28. In other embodiments, the display component may be a transparent micro display 202 that functions in place of, or in conjunction with, the projector/BSE arrangement.

In addition, the imaging system provides crucial information to a firing processor 34, which is part of the overall the fire control system. Firing processor 34 includes at least a firing computer 341. In preferred embodiments, the firing processor further includes a firing decision module 343. In still more preferred embodiments, the firing processor further includes an Epsilon Logic module 342. A firing computer (also referred to as a ballistics calculator) is a typical component on sophisticated aiming systems and performs activities such as calculating the adjusted aim-point to the required range, wind, inclining angle etc.; and typically uses ballistics tables and/or equations of the specific firearm and rounds. Firing decision module 343 is responsible for taking input from other systems/modules/processors and predicting whether the target can be hit. In preferred embodiments, this prediction, or more precisely the actual hit, is aided by use of a target area, called herein a firing zone or an "epsilon tolerance area" (or derivations of this term). This latter calculation is performed by the Epsilon logic module 342.

In embodiments, the FCS further includes Fire Control Mechanism 36 for translation of the firing decision into an actual firing event of the weapon. FCM 36 can be implemented in different ways, employing different concepts. The FCM can be a fire actuating mechanism, where the mechanism actively actuates the projectile discharge. The FCM can be a fire blocking mechanism, where the mechanism prevents regular actuation of one or several parts of the actuation mechanism of the firearm unless an additional signal is provided to the mechanism.

Aiming actuators 80 can be operationally coupled to the telescopic sight. The aiming actuator(s) are coupled to the weapon and move the barrel according to instructions received from the FCS/FCM/sight. The aiming actuator 80 generally tracks the firing zone of the locked on target so that when the firing mechanism is actuated the projectile will hit the target.

The FCM can work with guided munitions/lasers and/or energy weapons. Each of these solutions can be implemented in different ways, the details of which are outside of the scope of this document. However, within the scope of the present invention is that the instant telescopic sight can be adapted to work with any of these solutions.

In other embodiments, the firing mechanism is electronic (as opposed to trigger-actuated) and firing is actuated via FCM 36 by sending a signal to the electronic mechanism 362.

The system further includes user controls 60 for locking/unlocking onto the target or targets. The lock/unlock mechanism can be activated, for example, by a partial depress of the trigger, which optionally may require a trigger-depress dwell time e.g., a fast press allows regular shooting and a half press followed by a full press will actuate the aiming system. User controls 60 also typically include a lock update mechanism to update (adjust) the lock on position (location in the target area that the aiming system is locked onto). These mechanisms can be by way of any appropriate means, for example, a 4-way button, 5-way button, etc., or miniature joystick, as is known. User controls 60 can optionally have capability for inputting information such as target range, wind speed/direction, and other such data. However, inputs such as wind speed and target range, etc., can be estimated or measured by aiming system.

The FCS can include barrel motion sensors 70 to help calculate and predict the position of the barrel and movement of the user, e.g. shaking while aiming. In particular, it is the use of background features in the FOV that facilitate barrel movement calculations and predictions in embodiments that do not include barrel motion sensors.

Further, in some embodiments telescopic rifle sight can include additional sensors 70, such as Inertial Measurement Unit (IMU) sensors and/or environmental-type sensors, for example, one or more of the following components: microphone, inclinometer, accelerometer/inertial sensor; compass; GPS, temperature measurement device (e.g. thermometer, thermocouple); barometer; wind-meter; gyro, magnetometer, anemometer and other like. Such components can be added to telescopic sight/FCS to improve the accuracy and compensate for environmental factors that affect firing accuracy; to provide intelligence, e.g. a geospatial information system (GIS) and GIS data base, which may include capability for determining user location and user location with respect to friendly and unfriendly forces, navigational aids; and for event recording purposes. At least some of this information can be received and/or sent over a communication channel.

The Digital Optical Augmentation (DOA) System 20

The DOA 20 projects visual objects into the optical path. These objects can be divided into two categories: (1) objects derived from the imaging system; and (2) objects derived from other sources.

In the first category, as mentioned, the DOA receives input from the imaging system 18 and generates corresponding augmentation that is projected into the optical path. Visual objects related to targets within the FOV include, but are not limited to, highlighting shapes that indicate detected targets (e.g., a rectangle around a standing person or a box around a sitting person or moving vehicle), tracking shapes that indicate where to place the reticle for automated firing as well as other augmentations.

With regards to the second category, the DOA system also projects other data, not only based on the input from the imaging system. These visual augmentation objects can be informational objects such as view mode, status, range to target and the like. Furthermore, the DOA may project an aiming aid such as a red-dot or digital reticle into the optical path of the sight. It is noted that there is a great deal of interplay between the imaging system and the DOA system, such that it is not always clearly evident which visual objects belong in which category. As such, the aforementioned categories are intended to be a guide as opposed to a definitive rule. However, categorized, it is made clear that at least all of the augmentations discussed with regards to the SMASH 2000 FCS are present in the instant telescopic sight and projected by the DOA system.

The DOA projection mechanism may be an LCD or LED (e.g., an OLED, organic light-emitting diode) array of multiple individual LCDs or LEDs. Other types of aiming components include, but are not limited to, liquid crystal on silicon (LCoS), Micro-LED, laser projector and the like. In some embodiments, the micro-display may be a transparent display. According to the latter embodiment, the DOA does not project the various digital markers onto a see-through optical element but rather simply displays the markers on the transparent OLED (or other) display.

Day Mode—See-Through Mode

The telescopic sight has what is referred to herein as a "day mode" and a "night mode". The day mode is a true view (albeit magnified by the telescopic lenses) seen through the see-through optics of the scope. The scene presented to the user's eye is a real-world scene. In addition, the true view (magnified or not) may be augmented (Augmented Reality AR) and/or include a mechanical reticle.

Night Mode—Video Mode

In night mode, or video mode, the imaging system provides the visual data to the DOA which displays the real-time video feed inside the scope by projecting the imagery into the optical path (i.e., onto the see-through optics or second BSE). The displayed video is further augmented with projected markings in the same way that the [see-through] optics are augmented during the day. The video mode is useful for night vision, zeroing the optics, digital zoom and so forth. While this mode is termed "night mode" it is made clear that this term is not intended to exclude usage during the day but rather an easily identifiable name based on the regular use of the mode, i.e., at night.

In preferred embodiments, the video itself may be digitally enhanced with the markings, instead of projecting the markings onto the display. In such an arrangement, the video is captured by the imaging sensor 181, digitally modified by the detecting, tracking system (imaging processor 182) to include the augmentation objects and then displayed (projected into the optical path) as a digitally enhanced video by the DOA 20.

In an alternative embodiment, the imaging system has a sensitive low-light imaging sensor 181 that adequately captures the scene in the FOV, even in low light situations and the captured video is projected onto the see-through display inside the sight, by the DOA.

In day mode, the augmentations are augmented reality (AR), i.e., the real view is seen through the scope (albeit usually magnified) and the augmentations are projected onto that view. In night mode, the video is projected into the optical path and the augmentations are overlaid over the video (using either of the methods described above). The video is real time video (or as close to real time video as can be displayed, taking latency into consideration) that is captured by the imaging sensor. It is made clear that all the features of the SMASH 2000 are incorporated within the instant system.

In some embodiments, the video display inside the sight is smaller than the FOV of the sight. Exemplarily, the video display may be rectangular in shape, while the FOV of the sight is circular, with the rectangle fitting inside the circle. The video display overlays the see-through display such that when used in an environment with sufficient ambient light (e.g., during the day or in a well-lit location at night), the see-through scene is visible around the borders of the video display. While this arrangement gives the user a wider FOV, the disadvantage is that a very bright light source (such as a bright streetlamp or headlights from a car) can overwhelm or at least disturb the proper display of the video and projected markers. For example, a streetlamp may cause a light spot or stain to appear together with the video and interfere with the ability to see the video.

Accordingly, the instant scope 10 further includes a light blocking component or 'light blocker' 30—such as an aperture stop that blocks all light from the see-through optics—so that the light does not interfere with the ability to see the video. The light blocker 30 (sometimes simply referred to as a stop) can also be used during the day to zero the optics and imaging sensor. Also, the light blocker is helpful when using a digital zoom on a video feed (e.g. in real time or not in real time).

The light blocker is located in a position where the imaging sensor continues to receive [light from] the scene (for image processing)—via video optical path 24—but the scene (seen through see-through optics) does not reach the user's eye. Furthermore, the light blocker must be in front of the second BSE 28 so that it does not block the display of the DOA system from the user. The light blocker can also be used when an external (i.e., out of the optical path) camera is used, such as a thermal camera, such that the user can see the video of the camera.

Imaging System

The imaging system 18 includes at least an imaging processor 182 and an imaging sensor 181. As mentioned elsewhere, the instant telescopic sight has a video optical path 24 via which the imaging system 18 is able to capture imagery of the scene. One of the important advantages and innovations of the instant system is that the imaging sensor captures a "clean" scene, uncluttered by physical objects or digital visual objects. Accordingly, neither projected objects/augmentations (that are presented to the eye by the DOA projector such as informative data or digital aiming aids) nor physical aiming aids (such as a mechanical crosshairs or etched reticle) appear in the image captured by the image sensor.

Projected visual objects (e.g., red-dot, digital crosshairs) and/or physical aiming aids (e.g., etched reticle, mechanical crosshairs etc.) make it difficult to perform image processing on the imagery captured by the imaging sensor. If there are crosshairs etc. in the captured image (whether the result of digital augmentation or the sensor being 'behind' a physical marking), the processor needs first to remove the object from the image, or know to ignore it, before being able to work on a 'clean' image. Such preprocessing of the image may impose a "blind spot" for the processor where there is missing visual data in the cleaned areas.

(Legacy systems included the reticle/crosshairs etc. and any other digital augmentation in the imagery captured by the camera, because those images showed what the user was seeing, either for perpetuity or to be sent in real-time to a third party such as a command center.)

Innovatively, the instant system provides a telescopic sight with a Fire Control System (FCS). It is further innovative to provide a structural solution to provide the imaging sensor with a clean picture, even though DOA objects and/or even a physical reticle 32 is/are provided and presented to the user.

The term 'imaging sensor' is used throughout the description and in the claims. An image sensor or imager is a sensor that detects and conveys information used to make an image. It does so by converting the variable attenuation of light waves (as they pass through or reflect off objects) into signals, small bursts of current that convey the information. The waves can be light or other electromagnetic radiation.

The two main types of electronic image sensors are the charge-coupled device (CCD) and the active-pixel sensor (CMOS sensor). Both CCD and CMOS sensors are based on metal-oxide-semiconductor (MOS) technology, with CCDs based on MOS capacitors and CMOS sensors based on MOSFET (MOS field-effect transistor) amplifiers. Analog sensors for invisible radiation tend to involve vacuum tubes of various kinds. Digital sensors include flat-panel detectors. The term further includes forward looking infra-red sensor (FLIR), UV, multispectral or hyper-spectral cameras and image intensifiers. MWIR and LWIR require different lenses (that do not pass visual waves) and therefore cannot be used with the instant lenses. In such cases an additional camera is installed in a separate optical path.

The imaging sensor refers to any type of camera. The terms 'imaging sensor', 'camera' and 'CMOS' will be used interchangeably herein as a shorthand referring to any type of imaging sensor, without intending limitation to a specific type of technology. As mentioned, preferably, the sensor should be sensitive enough for low-light situations. In embodiments, the imaging sensor can sense a plurality of wavelengths including the visible spectrum, Near Infrared (NIR) and even infrared (IR). In such cases, the BSE may redirect the NIR or IR light to the sensor and not to the user eye (e.g., using a dichroic beam splitter). An NIR light affixed to the scope or weapon can enhance the ability of the sensor to capture the scene.

Night Vision Option

At times, such as at night, the scene is not readily visible to the human eye without help or enhancement. For example, low-light sensors "see" the scene, but the user/telescope sees an 'enhanced scene' or a 'video display' of the scene, e.g. on a screen or display panel of the night vision optics. The terms 'enhanced scene', 'field of view of the display' or 'field of display' are all used interchangeably herein to refer to the live, current, real-time scene as displayed on a display panel, eyelet or other medium of a night vision device, and whereby the scene has been 'enhanced' to improve visibility. The term 'field of display' can be used as a stand-alone term to simply refer to the FOV visible on a display (even when the display is not an enhanced scene).

Figure 5:
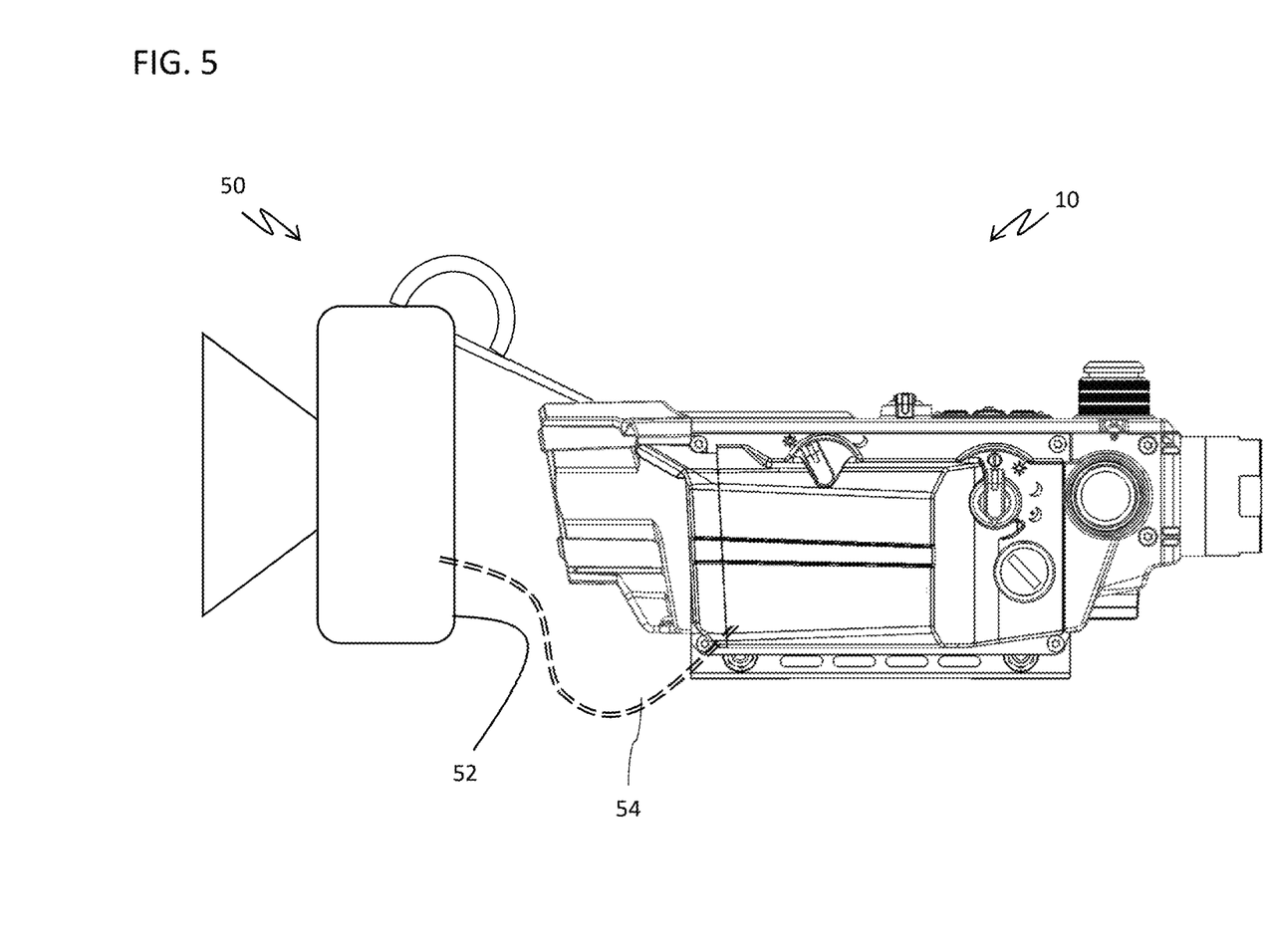

A first option is to add night-vision optics 50 to the front of the telescopic sight, e.g., in the form of an NV clip-on that is adapted to be removably attached to the firearm in front of the scope. The clip-on has a display which shows the enhanced scene. The display is positioned in front of the objective lens so that the user viewing through the scope sees the scene as displayed on the NV display 52. FIG. 5 illustrates the telescopic sight 10 with a NV 50 clip-on.

In embodiments, the night-vision apparatus is placed in front of the telescope. The user is able to view a display (live video)/viewfinder of the low-light device, through the scope. I.e., light or imagery from the low-light vision enhancing apparatus is received in the optical paths via the objective lens. In such a case, the NV optics are viewed in the see-through mode (day mode).

Importantly, not only is the user able to see the display but rather both the user optical path and the video optical path 'see' the display of the clip-on. Accordingly, the night-vision enhanced image/imagery is captured by the imaging sensor and fed into the FCS. I.e. the imaging sensor receives light via the video optical path 24 of the scope and captures the imagery displayed on the night-vision screen/viewfinder. These images and/or video frames of the low-light enhanced scene are transferred to the FCS processor for image processing/computer vision, as described elsewhere in further detail. The night-vision device may be any type of night-vision device, from any of the types of devices that employ image intensification, active illumination, or thermal imaging.

Special note is made regarding a night-vision device that employs starlight amplification. This type of image intensification is generally 'analog' (e.g., using a phosphor screen), meaning that it is not possible to project its video (which is a solution employed by legacy technologies, for night-vision devices other than starlight amplifiers).

Referring once again to all image night vision devices, the instant, integrated sensor captures the imagery of the phosphor screen (in front of the objective lens of the scope) and feeds the frames into the image processing/computer vision components of the imaging system 18. According to a first option, the DOA 20 augments the view of the NV display with projected visual objects in the manner described above.

A second option is for the DOA to project/display the captured video (received by the image sensor) plus augmentation (like in regular night mode), instead of the line-of-sight view of the NV display. This is in the video mode (night mode). This option provides various image processing options that can be applied to the video of the NV display. For example, the image processor may be able to "clean up" the NV video to look better than what is displayed on the NV display. However, with the extra processing step (capture by sensor, processing image and sending the image to the DOA for projection/display) there is increased latency. This additional latency, coupled with the inherent latency of the NV, may make this second option less preferable.

A third option is to provide an NV without a display (or to bypass the display when using devices that support such a bypass) and connect the NV directly to the imaging system or even directly to the DOA module to project the NV scene into the user optical path. The NV device can be connected to telescopic sight by an electrical coupling 54 such as a cable or an integrated docking port or indeed any other type or electrical connector including wireless connection. A connector may provide power and/or additional features such as turing the display on/off. According to this option, the NV may be an external device, such as a clip-on, or it may be a component that is attached to, or even integrated into the scope itself.

One example of this option is to employ a thermal camera that is built into the housing of the scope (e.g., in a side-by-side configuration, not sharing the same objective lens) or otherwise mechanically and electrically coupled thereto. The thermal camera is preferably zeroed to the same boresight as the telescopic sight. During manufacturing, the thermal camera can be calibrated to the imaging sensor (e.g., by image matching or partial image matching etc.), obviating the need to perform the boresighting procedure at a later stage. The thermal camera feeds the captured thermal images to the imaging system and/or to the DOA which projects the video into the user optical path for the user to see. The DOA may project only the thermal images or a combination (i.e., in see-through mode or a video mode, imagery from said night vision/thermal/other clip-on apparatus(es) is fused with a real-time/world scene or video) of the thermal images and the regular images of the same scene captured by the imaging sensor (e.g. overlay the thermal image over the regular image). Furthermore, the DOA also projects the visual augmentation objects onto the displayed video.

The clip-on may be of any technology that produces enhanced image to display. Clip-on technologies may include, but are not limited to: image intensifier, thermal clip on (SWIR, MWIR, LWIR), multispectral or fusion of different technologies or even active technology like LIDAR or the like.

Telescopic Configurations

For the purposes of this disclosure, the term 'front' of the telescope refers to the end with the objective lens and the term 'back' of the telescope refers to the end having the ocular lens. The directions 'in front of', 'behind' and the like are based on the direction of the optical path such that the objective lens is in front of the ocular lens and the ocular lens is behind the objective lens.

A telescopic lens has a classic structure, focusing the scene in two planes, the first focal plane (FFP) 42 at the front of the scope and the second focal plane (SFP) 44, behind the FFP. The image/scene is inverted twice (i.e., turned upside down and then re-inverted [erected], turning the picture/view the right way up again) between the FFP and the SFP.

In general, there are two types of solutions for inverting the view: erecting lenses 40 and prisms. There are two known options for prisms: a set of Porro prisms and roof prisms. Prisms are not discussed herein at any length but are considered to be viable alternatives.

Configurations of the instant telescopic scope that are detailed herein include the erecting-lens solution. This option is merely exemplary, albeit preferred, but nonetheless not intended to be limiting or exclusive of the option of using prisms. With regards to the erecting lens method, a set of lenses (e.g., six lenses, but more or less lenses are considered within the scope of the invention) called relay lenses or sometimes collectively called the erector lenses (as they are referred to herein) are employed. The term comes from the function of re-inverting the inverted image from the objective lenses into an upright end projection out of the ocular lenses, so that the view is actually in keeping with the orientation of the actual target/scene being observed.

With the erector configuration, the erector lens assembly is disposed within the optical path between the objective lens and the ocular lens/eyelet, between the FFP and the SFP. The scope can have a fixed magnification or if can have a variable magnification. All of the configurations discussed below can be equally applied to fixed magnification. With variable magnification (e.g. zoom×1-×10, or more) a group of lenses move relative to other lenses/groups of lenses to change the magnification.

In one embodiment/configuration, the group of moving lenses is grouped together with or in the erector lens assembly. This is referred to herein as the magnification being in the relay or erector assembly. In another configuration, the magnification mechanism is placed together with the objective lens assembly. This is referred to herein as the magnification being in the objective lens. Various configurations of the telescopic sight with magnification in the erector assembly are discussed below with reference to FIGS. 3A-3E. One configuration of the sight with the magnification in the objective lens assembly is discussed with reference to FIGS. 4A-4D below.

In many of the configurations, it is possible to select whether the aiming aid (physical or digital cross-hairs, reticle etc.) is in the FFP or the SFP. It is noted that when projecting visual objects (also referred to herein as "markings" or "drawing markings") in the FFP, the image and/or marking must be upside down and when projecting/drawing in the SFP, the image or marking is upright.

In configurations with variable magnification which is implemented in the relay/erector assembly there will be a difference where the aiming aid is placed. When the aiming aid is in the SFP the aiming aid remains a set size, regardless of the zoom magnification. When the aiming aid is implemented in the FFP, the aiming aid grows together with the magnification. Each configuration has advantages and disadvantages.

When adding the DOA markings and/or display (in addition to the mechanical/etched reticle), the markings and/or display suffer/s or benefit/s from the same advantages and/or disadvantages depending on whether the DOA module is implemented in the FFP or SFP. These advantages and disadvantages would now be clear to one skilled in the art, considering the instant description.

Figure 3A:
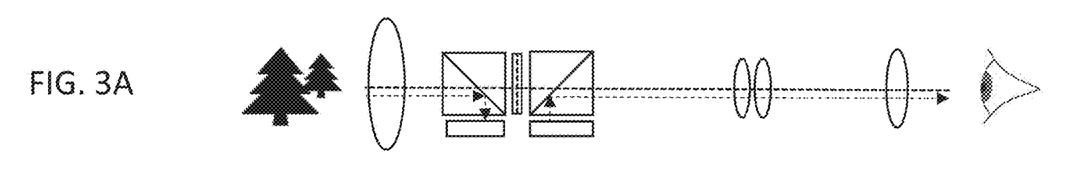
FIGS. 3A-3E are various optional configurations of the innovative smart telescopic sight.

FIGS. 3A-3E depict various optional configurations of the innovative smart telescopic sight. FIG. 3A depicts a configuration whereby the first BSE 22, the physical aiming aid (mechanical/etched crosshairs/reticle) 32 and the second BSE 28 are all in the FFP.

When the aiming aid is in the FFP, the digital augmentation markings (projected by the DOA) and the physical aiming aid grow or diminish in size together with the scene in the FOV of the scope (when the zoom is implemented in the relay). The imagery acquired by the image sensor, in this configuration, will remain the same regardless of the zoom level.

Figure 3B:
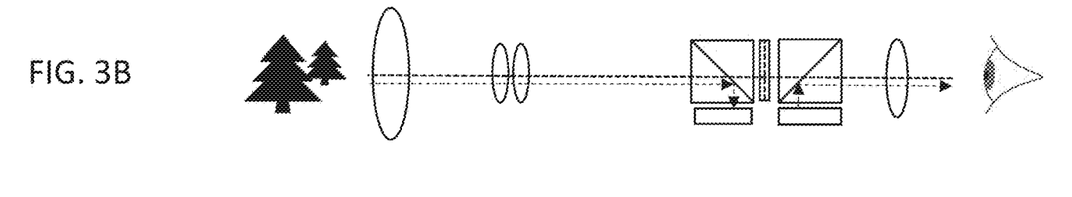

FIG. 3B depicts a configuration whereby the first BSE 22, the physical aiming aid (mechanical/etched crosshairs/reticle) 32 and the second BSE 28 are all in the SFP. In this configuration, the imaging system benefits from the magnification function. The physical reticle and the digital markings will remain the same size while the scene changes with magnification.

Figure 3C:
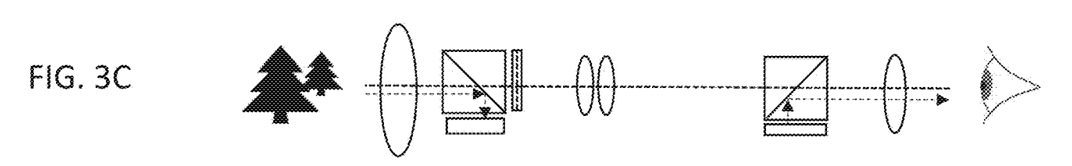

In FIG. 3C, the imaging system and the physical aiming aid are in the FFP and the DOA is in the SFP. When the DOA is in the SFP, the size of the DOA projections are set (non-changing) even when the zoom state or level changes. Accordingly, the fixed displays/markers (e.g., text/range display/battery status marker, thickness of the markers, etc.) will stay the same size, regardless of the change in zoom.

When the magnification changes, it is often desirable that the dynamic markers (e.g., 'firing zone') are automatically changed by the processor together with the state of the zoom. For example, indicators on the display that show the range to target, ballistic markers on the crosshairs etc. can be resized to fit the field of view of the scene.

According to other configurations the DOA is in the FFP and the mechanical reticle in the SFP or vice versa. Alternatively, both can be placed in the FFP (see for example FIGS. 3A and 3D) or both in the SFP (see for example FIGS. 3B and 3E). A large number of variations are possible. Whatever the configuration is, it is important—when aiming to achieve the advantage of having a clear view of the scene captured by the imaging sensor—that the imaging system be in front of (i.e. closer to the objective lens) the mechanical reticle and the DOA, or configured in a manner whereby the imaging sensor does not see the reticle or projected DOA objects/display, i.e. that the reticle and/or DOA display do not obstruct the FOV of the imaging sensor. Various exemplary configurations that provide an unobstructed view of the scene to the imaging sensor are detailed herein.

As explained, in some optical configurations, it is beneficial for the system to know the current zoom level (sensing can be implemented in various ways) to properly display various static and dynamic markings and drawings on the DOA, to make them visible and useful. The specific dependency between symbol size and/or position are linked to the position of the DOA (FFP or SFP). For example, static symbols (such as battery symbol), will be drawn the same when the DOA is in SFP, but will be dynamically changed with the zoom while DOA is in FFP.

Figure 3D:
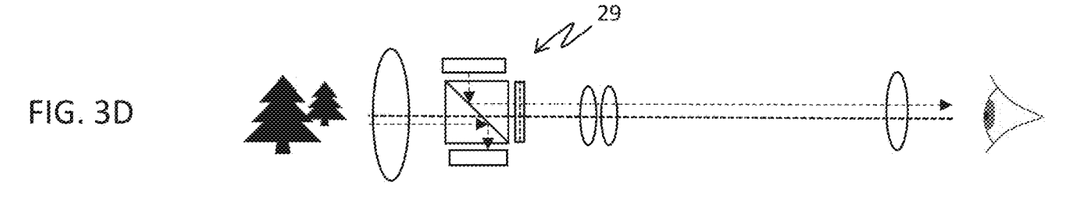
Figure 3E:
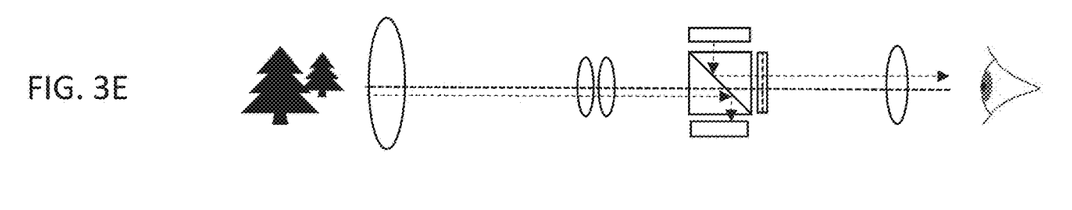
Figure 4A:
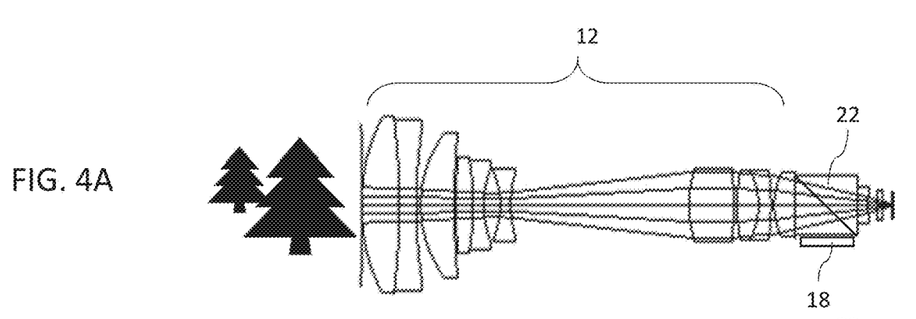
FIGS. 4A-4D are exemplary configurations of the instant telescopic sight with the magnification in the objective lens assembly.
Figure 4B:
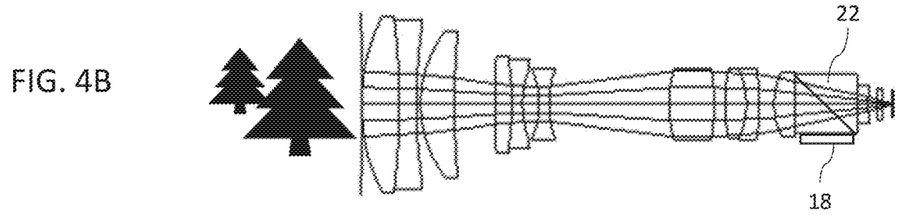
Figure 4C:
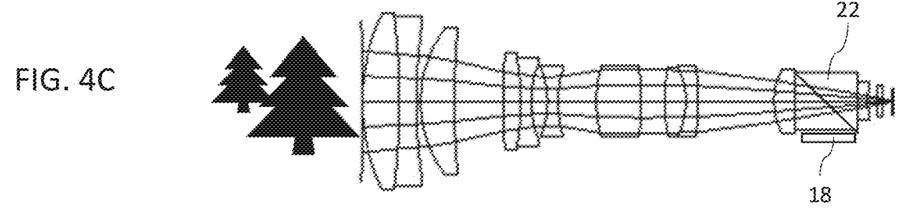
Figure 4D:
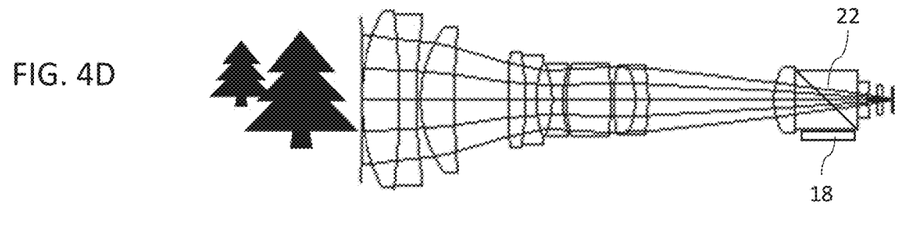

FIG. 3D depicts an exemplary configuration of the telescopic sight with a single BSE 29 in the FFP. FIG. 3E depicts an exemplary configuration of the telescopic sight with the single BSE 29 in the SFP. In either of the aforementioned configurations, the single BSE 29 performs both of the functions of the first BSE 22 and the second BSE 28, the descriptions of which are not repeated here for brevity but are to be seen as if fully set forth here as well.

In one embodiment, a video sensor (CMOS for example) can be added to the BSE on the opposite side of the DOA in a way that the sensor can capture the part of the transmitted display, the etched reticle and the scene view. In such configuration, the video sensor may be used without additional optics (but for various reasons, optics may be added). This configuration allows the system to see the etched crosshair relative to the DOA markers and by automatically detecting movements between the etched reticle and DOA (malfunctions) or enable automatic zeroing—that moves the digital markers/crosshair to the etched reticle location, instead of the user doing it manually). It is relevant if the zeroing is done to the etched reticle (and not the whole system together) and in cases where the riflescope is zeroed by the etched reticle first (as any standard riflescope) and not digitally first (in some cases like FCS with trigger control zeroing digitally has advantages and will be done first and then the user will "bring" the etched reticle to the right location as the digital markers/crosshair. This configuration may also enable to send "standard" video to the commander or HQ for example that is closer to what the user sees. This is closer to classical use of integrating camera in riflescopes.

A single BSE 29 may be implemented in a number of ways. According to one embodiment, the DOA projects the display on a specific wavelength or in a specific color or colors. A beam splitting element may be a beam splitter, a waveguide or even a filter that prevents the DOA projection from reaching the image sensor when the light is redirected to the imaging sensor while letting the rest of the spectrum of light from the scene pass through to the ocular lens. The markings from the DOA (either projecting onto a see-through element or the DOA itself is a transparent display) are also seen by the user, superimposed over the scene.

Exemplarily, if the DOA projection is in a specific wavelength or part of the spectrum, a dichroic beam splitter or some other beam splitting apparatus that is adapted to prevent the colors/wavelengths of the projection from reaching the image sensor. In general, it is possible that a portion of the light still passes through the beam splitting element. In such cases an additional filter between the beam splitting element and the image sensor can be used to ensure that none of the projected light from the DOA reaches the image sensor.

In another exemplary implementation, the DOA can be activated when the image sensor is inactive and vice versa, alternating at high speed, such as 60 Hz (or any other appropriate speed). The intervals will be short enough that the human eye will not notice that the DOA projection is flicking on and off.

When using a transparent micro-display (e.g., a transparent OLED), the need for a dichroic mirror or similar filter may not be necessary.

In yet another exemplary implementation, a different light polarization can be used for each of the channels, for example, one in horizontal polarization and the other in vertical polarization, so that each channel gets only the required image. In such a case, a polarized display source may be preferred—such as a laser projector or LCD, etc. However, a polarizing filter can also be added to a non-polarized display source.

Of course, these are only some exemplary implementations. Any technology that provides both sets of functions (as described for the first BSE and the second BSE above) are considered within the scope of the present innovation.

FIGS. 4A to 4D depict exemplary configurations of the instant telescopic sight with the magnification in the objective lens assembly. The magnification can be fixed or dynamic. Dynamic magnification can be controlled manually through mechanical adjustment of the zoom. Alternatively, the magnification can be controlled automatically with controls that manipulate an electromechanical mechanism that moves the lenses relative to each other.

FIGS. 4A, 4B, 4C and 4D each portray a different level of magnification. As mentioned, these states may be fixed or may be adjustable. The terms objective lens and objective lens assembly are used interchangeably herein as discussed elsewhere. Therefore, when describing the magnification in the objective, it can be said that the set of lenses for magnification are disposed adjacent to the objective lens or within the objective lens assembly or, simply, with the objective lens—all of which meaning the same thing.

In such a configuration, the imaging system 20 (and related BSE) is disposed directly behind the objective lens. This gives the imaging sensors a clear FOV (as discussed above) as well as benefiting from the magnification from the lenses in the objective assembly. The DOA 18 (and related BSE) is disposed behind the imaging system. The mechanical reticle 32 (if there is one, which is optional in some embodiments) can be located either behind the DOA or in front of the DOA, behind the imaging system.

A laser range finder (LRF) 38 (see FIG. 2) can optionally be integrated into the instant sight. In one embodiment, the laser is projected into the optical path but in a manner whereby the laser projects out of the objective lens. For example, the laser can be projected onto a BSE such as a dichroic mirror located in the optical path which reflects the laser from the laser source (located outside of the optical path) through the optical path and out of the objective lens. Such a BSE is otherwise transparent to the user and does not interfere with the user optical path in any way.

With the optional LRF, it is necessary to have a receiving sensor attuned to the LRF wavelength that will receive and register the reflected laser which indicates the distance to the target. The sensor may be imaging sensor 181 or may be a separate laser receiving sensor 183 dedicated to the LRF. The LRF may be external to the optical path.

In a similar fashion, a laser 38 can be projected from the telescopic sight in the visible or NIR light spectrum. Such a laser can be used to 'paint' a target for another targeting system (e.g., a targeting system of a laser guided missile) or as a visible aid (e.g., projected red or green dot) drawn on the target. Here, the term visible is intended to mean visible without NV optics as well as visible only with NV optics. The mechanism that projects the laser sight and/or the LRF is referred to herein as a laser source or simply laser 38. The laser source is adapted to project a laser beam out of the objective lens via at least a portion the user optical path.

The instant sight can also function to zero an LRF or projected laser sight. The LRF and/or laser sight may be internally integrated as described heretofore and/or may be external to the sight or at least not in the same optical path (e.g., the laser is provided within the housing of the sight but next to, or below, the telescopic optical path). In such embodiments, the imaging sensor 181 identifies the laser of the LRF (e.g., if the laser is in the NIR spectrum) and/or of the laser sight and zeros the location in the FOV.

In embodiments, the system allows for input for parallax correction at different ranges. Also, the image processing unit can ignore the red/green dot of the laser, as the system knows where it is supposed to be. If the laser is a non-visible laser, the system can display the location of the laser to the user (by projecting a dot on the internal display etc.).

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A telescopic sight for firearms comprising:
   magnifying elements disposed along a user optical path between an objective lens assembly and an ocular lens;
   an imaging system including an imaging sensor and an image processor, said imaging system disposed outside of said user optical path;
   a digital optical augmentation (DOA) system disposed outside of said user optical path;
   at least one optical element disposed within said user optical path between said objective lens assembly and said ocular lens, said at least one optical element adapted to:
      redirect at least a portion of a spectrum of incoming light from said objective lens assembly to said imaging sensor along a video optical path defined as being between said objective lens assembly and said imaging sensor,
      redirect/reflect digital markings projected from said DOA system into said user optical path and disallow said projected digital markings from reaching said imaging sensor, and
      allow at least a portion of said incoming light from said objective lens assembly to pass through said at least one optical element to said ocular lens; and
   wherein said imaging system is adapted to capture and process imagery from said incoming light redirected along said video optical path to said imaging sensor to provide image processing data.

2. The telescopic sight of claim 1, further includes a firing processor, said firing processor including a firing computer and at least one of: a firing decision module and an Epsilon logic module.

3. The telescopic sight of claim 2, wherein the telescopic sight is operationally coupled to a fire control mechanism which is adapted to receive inputs at least from said firing decision module.

4. The telescopic sight of claim 1, wherein at least a portion of said digital markings from said DOA system are derived from at least one of: said image processing data, a firing processor and other components of the telescopic sight.

5. The telescopic sight of claim 1, wherein said magnifying elements are disposed with said objective lens assembly, said magnifying elements providing fixed or dynamic magnification; or wherein the telescopic sight further includes an erector lens assembly disposed between said objective lens assembly and said ocular lens, and wherein said magnifying elements are disposed within said erector lens assembly, providing fixed or dynamic magnification.

6. The telescopic sight of claim 5, wherein said magnifying elements provide dynamic magnification where some of the magnifications are less than zoom ×1.

7. The telescopic sight of claim 1, further comprising a mechanical reticle disposed within said user optical path between said at least one optical element and said ocular lens, such that said mechanical reticle is not within said video optical path.

8. The telescopic sight of claim 1, wherein said at least one optical element includes a first beam splitting element adapted to redirect said portion of said spectrum of incoming light from said objective lens assembly to said imaging sensor along said video optical path;
and wherein said at least one optical element further includes a second beam splitting element adapted to redirect/reflect said digital markings projected from said DOA system into said user optical path and disallow said projected digital markings from reaching said imaging sensor, said second beam splitting element being closer to said ocular lens than said first beam splitting element.

9. The telescopic sight of claim 8, further including a mechanical reticle disposed between said first beam splitting element and said ocular lens.

10. The telescopic sight of claim 8, further including a light blocking element movably disposed between said first beam splitting element and said second beam splitting element.

11. The telescopic sight of claim 1, wherein said at least one optical element includes a beam splitting element adapted to redirect said portion of said spectrum of incoming light from said objective lens assembly to said imaging sensor along said video optical path;
and to redirect/reflect said digital markings projected from said DOA system into said user optical path and disallow said projected digital markings from reaching said imaging sensor.

12. The telescopic sight of claim 11, further including a mechanical reticle disposed between said beam splitting element and said ocular lens.

13. The telescopic sight of claim 1, wherein the telescopic sight is adapted to be operationally coupled with a night vision enhancing apparatus, wherein imagery from said night vision enhancing apparatus is received in said video optical path and said user optical path via said objective lens assembly, wherein in a see-through mode, a user views said imagery via see-through optics in said user optical path, with said digital markings superimposed onto said imagery.

14. The telescopic sight of claim 1, wherein the telescopic sight is adapted to be operationally coupled with a night vision enhancing apparatus and wherein imagery from said night vision enhancing apparatus is received via wired or wireless communication directly to said imaging processor and displayed by said DOA system.

15. The telescopic sight of claim 1, wherein in a see-through mode, a user views a real-world scene via see-through optics in said user optical path, with said digital markings superimposed onto said real-world scene; and/or wherein in a video mode, said DOA system causes a video to be visible via said ocular lens, wherein said video is a real-time video with said digital markings superimposed onto said real-time video.

16. The telescopic sight of claim 1, wherein the telescopic sight is adapted to be operationally coupled with a night vision enhancing apparatus and wherein in a see-through mode or a video mode, imagery from said night vision enhancing apparatus is fused with a real-world scene or video.

17. The telescopic sight of claim 1, further including:
a laser source adapted to project a laser beam via said user optical path, out of said objective lens assembly; and
a laser receiver or sensor.

18. The telescopic sight of claim 1, further including a laser range finder operationally coupled to the telescopic sight.

19. The telescopic sight of claim 1, wherein the telescopic sight is operationally coupled to at least one of:
user controls, said user controls are adapted for at least locking onto a target; and
at least one IMU-type sensor or environmental-type sensor.

20. A telescopic sight for firearms comprising:
a set of optical elements for magnification disposed along a user optical path between an objective lens assembly and an ocular lens;
an imaging system including an imaging sensor and an image processor, said imaging system disposed outside of said user optical path;
a digital optical augmentation (DOA) system including a transparent micro-display adapted to display digital markings in said user optical path;
an optical element disposed within said optical path between said objective lens assembly and said ocular lens, said optical element is adapted to:
redirect reflect at least a portion of a spectrum of incoming light from said objective lens assembly to said imaging sensor, and
allow at least a portion of said incoming light from said objective lens assembly to pass through said optical element to said ocular lens; and
wherein said imaging system sensor is adapted to capture and process imagery from said incoming light redirected to said imaging sensor to provide image processing data.

* * * * *